United States Patent
Bohman et al.

(10) Patent No.: US 12,524,518 B2
(45) Date of Patent: Jan. 13, 2026

(54) FEDERATED SECRET MANAGEMENT FOR WORKLOAD INSTANCES IN CLOUD COMPUTE PLATFORMS

(71) Applicant: Akamai Technologies, Inc., Cambridge, MA (US)

(72) Inventors: Peter Bohman, Cincinnati, OH (US); Gregory Bird, Medway, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 148 days.

(21) Appl. No.: 18/487,784

(22) Filed: Oct. 16, 2023

(65) Prior Publication Data
US 2025/0124120 A1    Apr. 17, 2025

(51) Int. Cl.
G06F 21/00     (2013.01)
G06F 21/45     (2013.01)

(52) U.S. Cl.
CPC .................. G06F 21/45 (2013.01)

(58) Field of Classification Search
CPC ..................................... G06F 21/45
See application file for complete search history.

(56) References Cited

U.S. PATENT DOCUMENTS

| | | | |
|---|---|---|---|
| 9,531,685 B2 * | 12/2016 | Gero | H04L 63/0442 |
| 9,531,691 B2 * | 12/2016 | Gero | H04L 63/0823 |
| 9,727,725 B2 | 8/2017 | Wagner et al. | |
| 9,961,114 B2 | 5/2018 | Srikanth et al. | |
| 10,116,658 B2 * | 10/2018 | Sade | H04L 63/0807 |
| 10,193,858 B2 | 1/2019 | Walker et al. | |
| 10,691,790 B2 | 6/2020 | Lounsberry et al. | |
| 10,819,701 B2 | 10/2020 | Bose et al. | |
| 10,931,450 B1 | 2/2021 | Chellappa et al. | |
| 10,965,457 B2 | 3/2021 | Lounsberry et al. | |

(Continued)

FOREIGN PATENT DOCUMENTS

| | | |
|---|---|---|
| CN | 112994872 B | 7/2021 |
| WO | WO20230051498 A1 | 4/2023 |

(Continued)

OTHER PUBLICATIONS

Machine Translation of CN1129947872A, downloaded on Dec. 19, 2023, 11 pages.

(Continued)

Primary Examiner — Kendall Dolly (57) ABSTRACT

A secret management infrastructure federates with a cloud compute platform to store, issue, track and revoke secrets issued to workload instances. A workload instance can be provisioned with a token and can present that token to the secret management infrastructure (SMI) in exchange for a credential. In addition to validating the token itself, the SMI can verify whether the workload instance is entitled to receive the credential based on label match. The label is typically workload operator defined and corresponds to one or more attributes that the workload instance must possess, particularly physical, hardware, or software attributes. Preferably the secret management infrastructure verifies that the workload instance matches the label (that is, it has the necessary attributes) from the control plane of the cloud compute platform, or other source independent of the workload instance.

19 Claims, 6 Drawing Sheets

(56) References Cited

U.S. PATENT DOCUMENTS

| | | | |
|---|---|---|---|
| 10,972,265 | B2 | 4/2021 | Novak |
| 10,972,444 | B1 | 4/2021 | Schiesser |
| 11,121,869 | B1 | 9/2021 | Crahen et al. |
| 11,418,352 | B2* | 8/2022 | Williams ............ H04L 63/0209 |
| 11,494,493 | B1 | 11/2022 | Baird |
| 11,496,519 | B1 | 11/2022 | Gupta et al. |
| 11,537,725 | B2 | 12/2022 | Muniswamy-Reddy et al. |
| 11,588,801 | B1 | 2/2023 | Manghnani et al. |
| 11,711,351 | B2 | 7/2023 | Lekov et al. |
| 11,762,980 | B2 | 9/2023 | Lounsberry et al. |
| 11,818,115 | B1 | 11/2023 | Shah et al. |
| 11,930,045 | B1 | 3/2024 | Baker et al. |
| 12,067,119 | B1 | 8/2024 | Brandwine |
| 12,192,344 | B2 | 1/2025 | Ganguly et al. |
| 12,255,886 | B2 | 3/2025 | Neate |
| 12,282,540 | B1 | 4/2025 | Chandrashekar |
| 12,314,234 | B1 | 5/2025 | Prateek et al. |
| 12,363,148 | B1* | 7/2025 | Nanduri .................. G06F 21/57 |
| 2008/0320310 | A1 | 12/2008 | Florencio et al. |
| 2014/0245376 | A1* | 8/2014 | Hibbert ................. G06F 21/554 726/1 |
| 2014/0282929 | A1* | 9/2014 | Tse ..................... G07C 9/00309 726/5 |
| 2015/0222604 | A1* | 8/2015 | Ylonen ..................... H04L 9/14 713/171 |
| 2016/0019475 | A1* | 1/2016 | Bryksa ................. H04W 12/084 705/51 |
| 2017/0322929 | A1 | 11/2017 | Hussain et al. |
| 2019/0068622 | A1 | 2/2019 | Lin et al. |
| 2019/0260599 | A1 | 8/2019 | Williams et al. |
| 2022/0019478 | A1* | 1/2022 | Sridharan ............. G06F 9/5072 |
| 2022/0021652 | A1 | 1/2022 | Moghe et al. |
| 2022/0200801 | A1 | 6/2022 | Potlapally et al. |
| 2022/0200972 | A1 | 6/2022 | Potlapally et al. |
| 2022/0222099 | A1 | 7/2022 | Srivastava et al. |
| 2022/0357993 | A1* | 11/2022 | Toal ..................... G06F 9/5083 |
| 2022/0374512 | A1 | 11/2022 | Gerganov et al. |
| 2023/0032814 | A1 | 2/2023 | Pandurangan |
| 2023/0237204 | A1 | 7/2023 | Khatri et al. |
| 2023/0239280 | A1 | 7/2023 | Khatri et al. |
| 2023/0297664 | A1* | 9/2023 | Soryal .................. H04L 63/061 726/6 |
| 2024/0022550 | A1 | 1/2024 | Raghuram et al. |
| 2024/0073010 | A1 | 2/2024 | Ganguly et al. |
| 2024/0187376 | A1 | 6/2024 | Moghe et al. |
| 2024/0303347 | A1 | 9/2024 | Esra et al. |
| 2025/0119435 | A1 | 4/2025 | Boyer et al. |

FOREIGN PATENT DOCUMENTS

| | | |
|---|---|---|
| WO | 2024236072 A1 | 11/2024 |
| WO | 2025072523 A1 | 4/2025 |

OTHER PUBLICATIONS

U.S. Appl. No. 18/487,799, filed Oct. 16, 2023 (counterpart to current application) available in IFW.

Kubernetes, "API Access Control," https://kubernetes.io/docs/reference/access-authn-authz/_print/ downloaded on Sep. 18, 2023, 196 pages.

Kubernetes, "Authenticating, Users in Kubernetes," https://kubernetes.io/docs/reference/access-authn-authz/authentication/ downloaded on Sep. 18, 2023, 29 pages.

Kubernetes, "Authentication Resources," https://kubernetes.io/docs/reference/kubernetes-api/authentication-resources/_print/ downloaded on Sep. 18, 2023, 42 pages.

Vault, "AppRole auth method (API), " https://developer.hashicorp.com/vault/api-docs/auth/approle downloaded on Sep. 18, 2023, 25 pages.

Vault, "Auth methods," https://developer.hashicorp.com/vault/docs/auth downloaded on Sep. 18, 2023, 2 pages.

Vault, "Kubernetes auth method," https://developer.hashicorp.com/vault/docs/auth/kubernetes downloaded on Sep. 18, 2023, 12 pages.

Vault, "Vault Agent with Kubernetes," https://developer.hashicorp.com/vault/tutorials/auth-methods/agent-kubernetes downloaded on Sep. 18, 23, 32 pages.

European Application No. 24206916.9, counterpart application, ESSR mailed on Mar. 18, 2025, 10 pages.

Da Silva, M., "Integrating SPIFFE and SCONE to Enable Universal Identity Support for Confidential Workloads, Jan. 1, 2021. 94 pages," URL:http://dspace.sti.ufcg.edu.br:8080/XML retrieved on Feb. 19, 2025.

U.S. Appl. No. 18/487,799, filed Oct. 16, 2023, Non Final Rejection mailed on Jul. 15, 2025, 218 pages.

* cited by examiner

FEDERATED SECRET MANAGEMENT FOR WORKLOAD INSTANCES IN CLOUD COMPUTE PLATFORMS

BACKGROUND

Technical Field

This application generally relates to the management of secrets, such as keys and credentials, in distributed computing environments.

Brief Description of the Related Art

It is known in the art to use a dedicated infrastructure to manage the secure storage, distribution, and issuance of secrets to computing resources. Such infrastructures have been in use for years with content delivery networks, where they are used for issuing content provider TLS keys to edge servers, among other things. In addition, secret management solutions have been integrated with various cloud compute platforms, enabling the distribution of secrets to workloads running on ephemeral or long-lived compute instances, such as virtual machines, linux containers (such as kubernetes), or otherwise.

Current infrastructures do not integrate with all compute platforms, particularly those that do not generate their own workload instance authenticators. Furthermore, currently the issuance of credentials in these platforms could be improved by more deeply integrating with compute platforms to enhance security posture awareness, perform security checks and to generally improve the efficiency of secret management and issuance. This patent document addresses these issues and provides other improvements in the field that will be apparent to those skilled in the art upon review hereof.

The teachings presented herein improve the functioning of a computer system itself, as well as that of a larger distributed system comprised of many computers. Those skilled in the art will understand these and other improvements from the teachings hereof.

BRIEF SUMMARY

This section describes some pertinent aspects of this invention. Those aspects are illustrative, not exhaustive, and they are not a definition of the invention. The claims of any issued patent define the scope of protection.

In embodiments described herein, a secret management infrastructure federates with a cloud compute platform to store, issue, manage and revoke secrets issued to workload instances. A workload instance presents a token to the secret management infrastructure (SMI) in exchange for a credential. In addition to validating the token itself, the SMI can verify whether the workload instance is entitled to receive the credential, e.g., based on an integration with the compute platform and a flexible label match. The label is typically operator defined and corresponds to one or more attributes that the instance must possess, such as physical, hardware, or software attributes. Preferably the SMI verifies that the workload instance matches the label (that is, it has the attributes) from the control plane of the cloud compute platform, or other source independent of the workload instance presenting the token.

Upon determining that the token is valid and label matches, among other things, the SMI returns the appropriate credential to the workload instance. The workload instance then uses that credential to access a set of SMI secrets that the identity is authorized to access. In this way, an operator may establish and enforce a relationship between the security posture of a workload instance in the platform, and the set of SMI secrets that are accessible.

A workload instance can upgrade its credential by passing an audit via an audit system that is integrated into the infrastructure. The workload instance can use the upgraded credential to access higher-level secrets.

In some embodiments, the workload obtains the initial credential in order to fetch encryption keys it can use to create and/or verify its associated encrypted file system, as well as to register with and authenticate to the audit system. Upon passing an audit dependent on the satisfactory operation and integrity of such encrypted file system, the workload instance elevates its credential to be able to access other secrets, such as those necessary to contact other services in the computing platform.

The secrets managed by the SMI may be credentials, cryptographic keys, and other items, but are not limited to those examples; they can be any data deemed sensitive and/or for which restricted access is desired or for which a dedicated management infrastructure is desired.

The workload instance may be any processing unit in a cloud compute platform, including with limitation virtual machines (regardless of virtualization model), Kubernetes pods, containers, or otherwise.

The claims are incorporated by reference into this section, in their entirety.

BRIEF DESCRIPTION OF THE DRAWINGS

The invention will be more fully understood from the following detailed description taken in conjunction with the accompanying drawings, in which.

Numerical labels are provided in some FIGURES solely to assist in identifying elements being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web and networking technologies and terms, such as HTML, URL, TLS, HTTP all versions, HTTP over QUIC, TCP/IP, and UDP, is assumed.

All references to HTTP should be interpreted to include an embodiment using encryption (HTTP/S), such as when TLS secured connections are established. While context may indicate the hardware or the software exclusively, should such distinction be appropriate, the teachings hereof can be implemented in any combination of hardware and software. Hardware may be actual or virtualized.

Overview

In content delivery networks (CDNs), a secret management infrastructure (SMI) is used to generate, rotate, and deliver secret material to deployed applications. Such infrastructure typically includes an audit service that checks machines against their expected configuration and signs of tampering.

The teachings of this patent document extend the capability of a traditional infrastructure to workloads running on machines outside of CDN servers to other types of machines, such as cloud compute instances. The design is modular to support various cloud provider integrations and workload types, such as virtual machines (VMs), containers, and so on.

The following terminology is used in this document.

| Term | Meaning |
| --- | --- |
| collection | A named set of definitions that share the same access controls. Every definition belongs to a collection. All access control decisions are made at the collection level unless definition level controls are specified. |
| definition | The name and associated configuration options that describe a secret for a particular purpose. Every secret belongs to a definition. A definition can contain multiple secrets as newer versions become available. |
| credential | A credential that makes assertions to the secret server, the relying party in this design. Typically a credential asserts an identity and workload instance attributes to the secret server (and in such case is sometimes referred to as an 'identity credential'.) |
| identity projection | Maps verifiable attributes of a workload instance to a deterministic identity in the infrastructure. Used to issue credentials to workload instances. A workload operator can add an identity projection that constrains the attributes (e.g., labels, regions, platform identities, etc.) of the workloads that can access credentials associated with the projected identity. |
| instance | An instantiation of a workload running on infrastructure supporting a workload. Could be a VM instance, kubernetes pod, or serverless invocation. |
| SMI groups | Groups of entities (users, machines, workloads) used to authorize access to resources. |
| secret | Any piece of data managed by the infrastructure. A secret can contain multiple parts, some of which are actually public (for example, a certificate in a ssl_cert). Secrets can be generated automatically within the SMI or generated elsewhere and provisioned into it. Examples of secrets include encryption/decryption keys, credentials, certificates, and any other item of data useful in authenticating or authorizing operations. |
| region | A region describes the geographic location of cloud resources. |
| workload | An application or process typically limited to one or a few functions that can be instantiated. Examples of workloads include, for example, one or more interchangeable kubernetes pods, virtual machines, or serverless invocations. A workload is a class, not an instance. |
| workload operator | The human or automated service that is responsible for provisioning infrastructure for workloads. |

High Level Design

Figure 1:
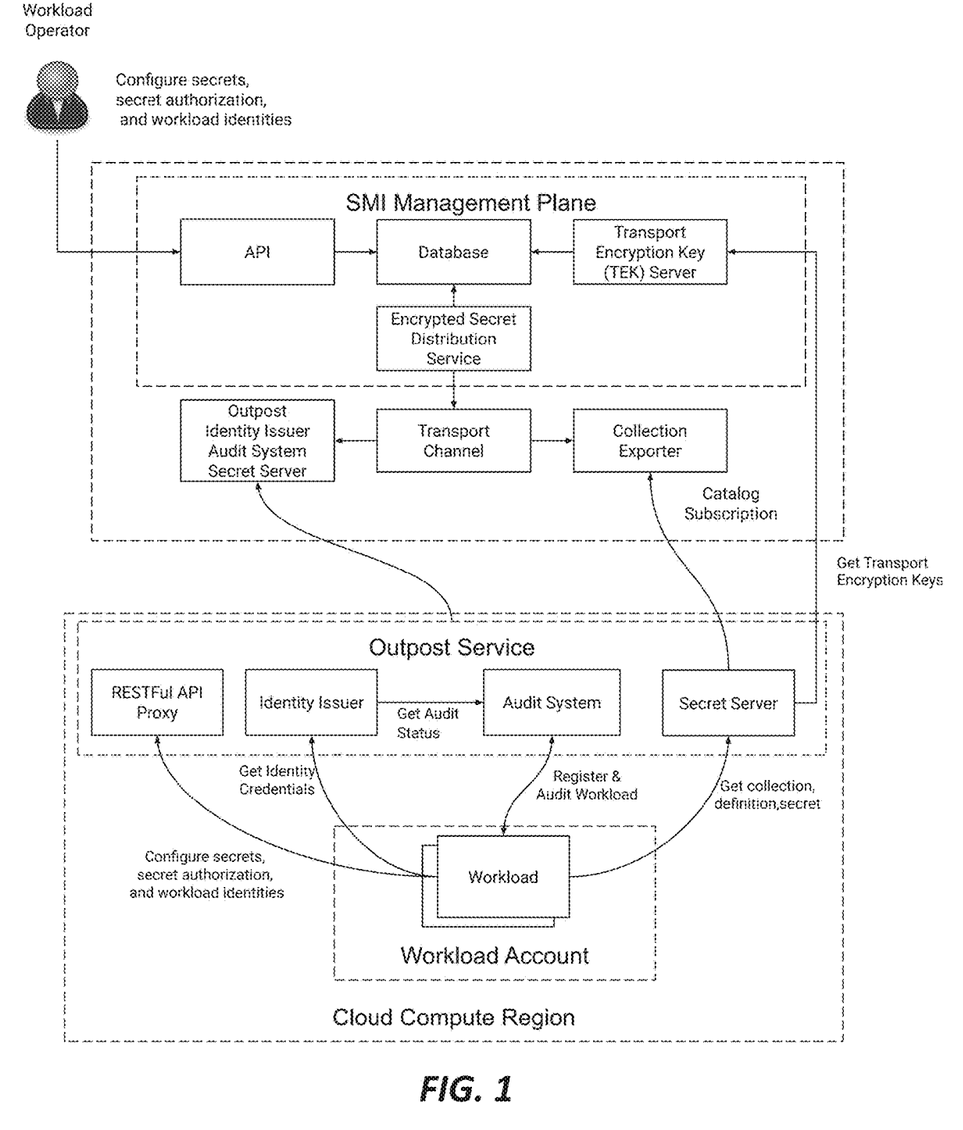
FIG. 1 is a block diagram illustrating a secret management infrastructure, in accordance with one embodiment of the teachings hereof.

FIG. 1 illustrates components of the SMI at a high level. Outpost services are deployed in an account in the supported cloud compute platform regions. The outpost service is implemented as a multi-instance (one per region), multi-tenant (serves all tenants in the region) deployment. Instances of the service in the outpost can be deployed across availability zones in cloud compute platform regions that support availability zones.

The outpost service provides such things as:
Low latency operations on secrets to support software implemented hardware-security module (software-hsm) capabilities
Access to secrets without depending on services outside the workload's availability zone
Network isolation using virtual private cloud (VPC) on cloud compute platforms that support VPC peering
A layer of protection (filtering, caching, sanitization, rate limiting) for the central services
Network performance and minimal cost savings using in-region networking between Outpost and clients The workloads communicate with the identity issuer to retrieve credentials, with an audit system to register and initiate audits, and with a secret server to retrieve secret material. workload operators and deployment automation tools use an API to manage workload identities, authentication configurations, audit configurations, and secrets.

The outpost service components synchronize configuration from the backend components in the SMI Management Plane.

The secret server fetches bulk encrypted secret content (catalogs and encrypted secrets) on-demand from the Collection Exporter. The collection exporter is a service that sends the subset of content being handled by the management plane that is authorized for export to cloud compute regions. It should be understood, then, that the management plane can also be sending other subsets of content to other types of systems, such as CDN nodes, or different types of outpost services for different cloud compute platforms.

The transport encryption keys used to decrypt and verify the secrets are fetched by the secret server from a transport encryption key (TEK) service that authorizes access to secrets and releases the transport encryption keys to the requestor.

Detailed Design

Identity Issuer

Figure 2A:
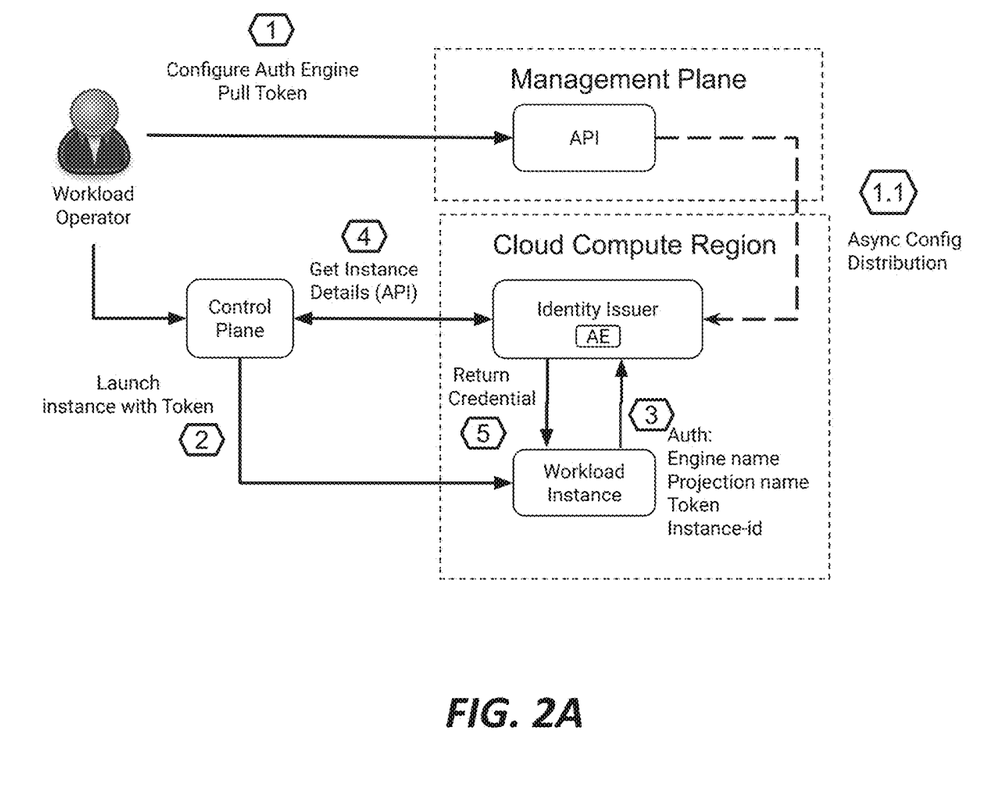
FIGS. 2A and 2B are block diagrams illustrating a workflow for issuing credentials to a workload instance, in accordance with one embodiment of the teachings hereof.
Figure 2B:
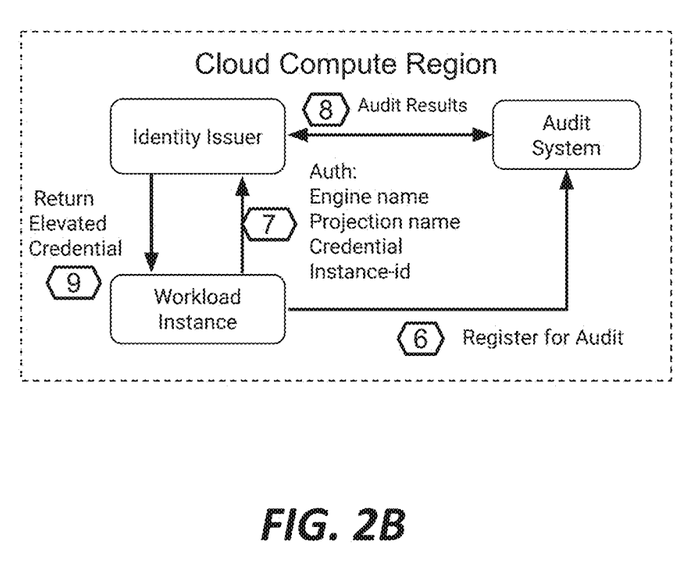

Distributing secrets to a workload instance requires authenticating and authorizing the workload instance. But to authenticate the workload instance, the instance must have a trusted credential that asserts its identity. The identity issuer issues a credential to a workload instance based on interactions with authentication mechanisms provided by the workload's underlying cloud compute platform. The exact workflow may vary across platforms, so the identity issuer can support plugins for the different providers to produce a consistent identity and credential framework for all workload types. FIGS. 2A and 2B thus illustrate one example.

In addition to authentication and authorization, access to some secrets must also be predicated on an audit of the target instance's state, including signs of compromise. The audit of an instance also requires authentication of the target so the audit system can be sure it hasn't been duped into auditing a decoy instance. Typically, to audit a target system, the root file system must be available for audit, however the file system may require decryption keys before it can be mounted. Some types of workloads may not require disk encryption or thorough audits because the underlying cloud compute platform provides those capabilities. The teachings hereof support workflows that have this requirement and those that do not.

The identity issuer can manage identities along with attributes associated with the workload's audit status and environment so that those factors can be integrated into secret authorization while also supporting access to secret material (e.g., disk encryption keys) prior to audits.

In sum, the SMI can be implemented such that a workload can request a credential from the identity issuer even without making claims about its audit state. It could use this credential to register for audits and decrypt its root filesystem (Register and Audit workload shown in FIG. 2). It will then be able to elevate its access by requesting another credential from the identity issuer that includes audit claims and finally use that credential to request secrets.

Workflow Description

FIGS. 2A and 2B illustrate a process of the identity issuer issuing a credential to a workload instance. Once the workload instance has a credential it can then fetch secrets from the secret server, as shown in FIG. 1. In some cases, an audit may be required for access to some credentials, as mentioned; FIG. 2A shows the base example, and FIG. 2B adds the audit to the workflow.

At a high-level, the workflow establishes machine credentials by requiring that:
a. The requesting workload instance presents a token that was issued for an identity projection in the authentication engine and that was securely distributed to the workload instance by the workload operator.
b. The token is verified and was issued for the requested identity projection.
c. The source IP address of the authentication requestor matches the private IP address assigned to the instance-id in the authentication request.
d. The label associated with the instance-id provided in the authentication request matches one of the allowed labels in the authentication engine identity projection.
e. The cloud provider region associated with the instance-id provided in the authentication request matches one of the allowed regions in the authentication engine identity projection.

The authentication engine ("AE") is a software component that is instantiated by a workload operator using, e.g., an API (such as a RESTful API, or using SOAP, CORBA, or otherwise as known in the art). An AE instance is hosted by an identity issuer. The AE is responsible for authenticating workloads and assigning an identity and credential to workloads. The identity asserted by a credential can be granted permission to secret collections by secret owners using conventional authorization controls and group management. The way in which such collections are structured or managed is not crucial to the teachings hereof, any suitable implementation may be used.

A workload operator can configure an AE and identity projections that the AE will handle, preferably via the aforementioned API. The AE contains one or more identity projections, each of which has a name and the constraints of the identity projection (see definition of identity projection). An AE issues a credential to a workload instance.

The teachings hereof are agnostic to the type and format of the credential issued by the AE executing in the identity issuer, as such characteristics will vary depending on the needs of a particular implementation. An example of a suitable credential is an X.509 certificate binding a key pair to the certain data as shown below:

| Data Type | Data Name | Description |
| --- | --- | --- |
| Metadata | Certificate Issuer | The subject name of the issuing certificate authority |
| | Validity Period | The validity time period for the certificate |
| | Certificate Serial | A (random) unique identifier for the issued certificate |
| Standard Claims | version | The version of the credential standard claims which will be used to define the rest of the claims. |
| | identity | The identity projection |
| | engine-type | The type of authentication engine that issued the credential |
| | instance-id | A platform specific identifier for a workload instance. Defined by the platform specific authentication engine. |
| | region-id | The cloud compute platform identifier for the region, data center, or cluster where the workload is provisioned. Defined by the provider of the cloud compute platform. |
| | provider-id | The cloud compute platform provider (vendor id) |
| Key Pair | Certificate Key Pair | Elliptic Curve P-256 key pair, for example |

The API of the SMI Management Plane can provide the following endpoints to the workload operator:

| Create or Update Authentication Engine (AE) | |
| --- | --- |
| Description | Create or update AE |
| Input | account: name of SMI account where AE will be provisioned |
| | authentication engine name: name of the AE |
| | access token: an "access token" for SMI to use in authenticating to the compute platform control plane API when fetching information about workloads that use this engine (e.g., in step <4> of FIG. 2A). The token should be granted read access on instances. |
| Output | Success or Failure |

| Create Identity Projection | |
| --- | --- |
| Description | Create or update identity projection |
| Input | account: SMI account for AE |
| | authentication engine name: name of the AE |
| | projection name: name of the identity projection |
| | allowed instance_labels: A list of the allowed instance labels that a workload instance label must belong to in order to authenticate using the projection. |
| | allowed_regions: A list of regions that a workload instance must be deployed in to authenticate using the projection. |
| | TTL: time to live of the credential issued by the identity projection |
| Output | Success or Failure |

| Create Identity Projection Token | |
| --- | --- |
| Description | Retrieve a token for the Identity Projection |
| Input | account: the name of the account where the AE was provisioned |
| | authentication engine name: The name of the authentication engine containing the identity |
| | projection name: The name of the identity projection configuration |
| | TTL: The max lifetime of the token to be created |
| Output | On success: JSON Web Signature (JWT) [RFC7519] object, signed using private key. |

The identity issuer can provide the following endpoints to workload instances:

| Workload Authentication | |
| --- | --- |
| Description | Workload authentication API |
| Input | account: the name of the account where the AE was provisioned |
| | authentication engine name: The name of the authentication engine containing the identity |
| | projection name: The name of the identity projection configuration |
| | token: a previously issued valid token for the identity projection |
| | instance_id: compute platform instance ID |

| | Workload Authentication |
|---|---|
| | audit_uuid: <optional> The audit registration UUID for the instance<br>TTL: the lifetime of the credential to be created |
| Output | On success -<br>An x509 certificate and key. The certificate will be bound to the identity projection name and workload attributes including audit attributes if the audit_uuid was provided and the audit system has results for the UUID.<br>A refresh token that can be used to re-authenticate to this API to obtain a new certificate/key. |

With the foregoing background, the workflow that is illustrated in FIG. 2A is now described in detail.

FIG. 2A begins at <1> with a workload operator configuring an AE and Identity Projection using the API of the SMI Management Plane. The workload operator pulls a generated token from the configured Identity Projection. The token may be implemented as a JavaScript Object Notation (JSON) web token (JWT) with a JSON Web Signature (JWS) header, although the exact form is not crucial to the teachings hereof. At <1.1>, the AE configuration is distributed to the identity issuer in one or more instances of an outpost service (i.e., an "Outpost"). Configuration can be updated or distributed when a token is created.

At <2>, the workload operator uses the control plane of the cloud compute platform to deliver the token to a workload instance, e.g., using an API to create the VM and pass it VM user metadata including the token.

At <3>, the workload instance attempts to authenticate to the configured identity projection endpoint (ie, the endpoint associated with the identity projection configured in step <1>) at the identity issuer. The workload presents its token and instance-id. The AE verifies the token and requests the instance's details from the cloud compute platform's control plane at <4>.

More specifically, the AE verifies the token and that the identity in the token matches the identity projection from the request <3>. The AE queries the compute control plane for certain information at <4>, including the currently assigned IP address of the workload instance-id, the label assigned to it, and the region where it resides. The AE verifies that the source IP address of the workload instance's request in <3> matches the currently assigned IP address of the workload instance, as reported by the control plane. The AE verifies that the instance label and region reported by the control plane for the particular workload instance is one of the allowed labels and regions configured in the identity projection. This means that the label that was just verified as being assigned to the workload instance must be allowed in the identity projection as configured by the workload operator.

Hence, the workload operator is able to define a set of labels describing attributes of the workload instances, and to require a workload instance to match any one or more of such labels as a condition of receiving a credential. (Alternatively, the access level of the credential returned may vary based on whether the label matches.)

Also, the workload operator is able to have confidence that the workload instance requesting authentication at <3> has an IP address that matches what the control plane says it should be—and this information is checked at the time of the authentication request. The workload operator does not need to provision the identity issuer with the expected IP address (or CIDR block) ahead of time, or bind the token in <2> to such information, both of which are problematic because IP address assignments may be unknown at configuration time and regardless often change in compute platforms.

Typically the label corresponds to one or more physical, hardware, or software attributes which can be verified independently from the cloud compute platform's control plane. Example uses cases include:

a. A location-based label that requires the workload instance be located in a given geography or country to receive the credential.

b. A label corresponding to a software attribute such as operating system, software version, application name, patch and update status, security posture, installed software—thus requiring the workload instance to have certain software and/or versions thereof to receive the credential.

c. A label corresponding to a hardware attribute such as certain hardware processors, memory, tamper-protection devices, or specialized circuitry like secure enclaves or encryption hardware—thus requiring the workload instance to have certain hardware to receive the credential.

In an alternative embodiment, the identity issuer can query the control plane at <4> for the attributes above (rather than a label) and match them to a label (in this approach, the label is an N-tuple containing the attributes for the identity issuer to interpret).

At <5>, if the foregoing checks are passed, then AE returns a credential for the projected identity to the workload instance.

Access to some secrets may be predicated on an audit of the target instance's state, including signs of compromise. FIG. 2B illustrates an embodiment in which the workload instance is audited. This process occurs after the workflow in FIG. 2A is completed and the workload instance has the basic credential. Successfully passing the audit enables the workload instance to elevate its credential (e.g., the workload instance can present it to the secret server and be able to access more sensitive secrets).

At <6> in FIG. 2B, the workload instance contacts the audit system and registers for an audit. The workload would present the credential that it obtained in FIG. 2A to authenticate. The audit process is not shown in detail in FIG. 2B, but it may be completed in any conventional manner. For example, the audit can be performed by examining the filesystem on the machine for unexpected changes to system binaries and their configuration or unexpected modules loaded in the operating system.

Note that some aspects of an audit may require creating an encrypted file system, or if already created, then decrypting the disk. The workload instance may obtain the keys necessary for doing so by presenting its (non-elevated) credential to the identity issuer and requesting them.

At <7>, the workload instance requests the elevated credentials using its existing (non-elevated) credential. The identity issuer can then check that the audit has been passed by requesting audit status from the audit system at <8>, though alternatively the audit system could push status for each workload instance to the identity issuer ahead of time. If the workload instance passed the audit, the identity issuer can respond accordingly, returning the elevated credential at <9> if indeed the workload instance passed the audit, and otherwise denying the elevated credential. (Note that the elevated credential is notated as credential+ in this document.) The audit can be redone periodically or on-demand by the audit system, and the results reported to the identity issuer and/or workload operator. An audit failure would prevent the identity issuer from issuing new credentials including a claim that audits have passed while also raising an alert for an operator to take action, such as revoking previously issued identity credentials.

Figure 3A:
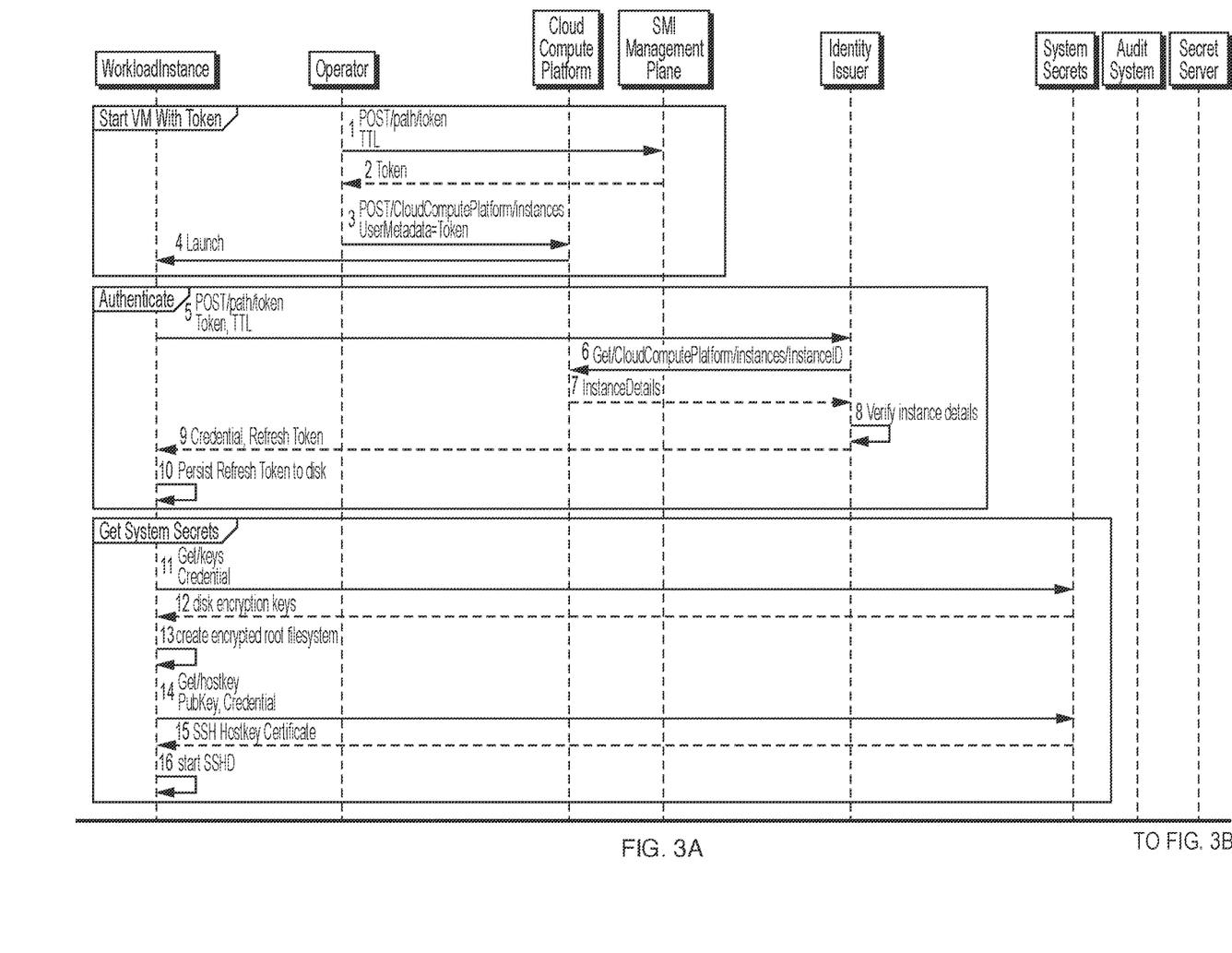
FIGS. 3A and 3B are a sequence diagram illustrating a workflow for issuing credentials to a workload instance, in accordance with one embodiment of the teachings hereof; and, FIG. 4 is a block diagram illustrating hardware in a computer system that may be used to implement the teachings hereof.
Figure 3B:
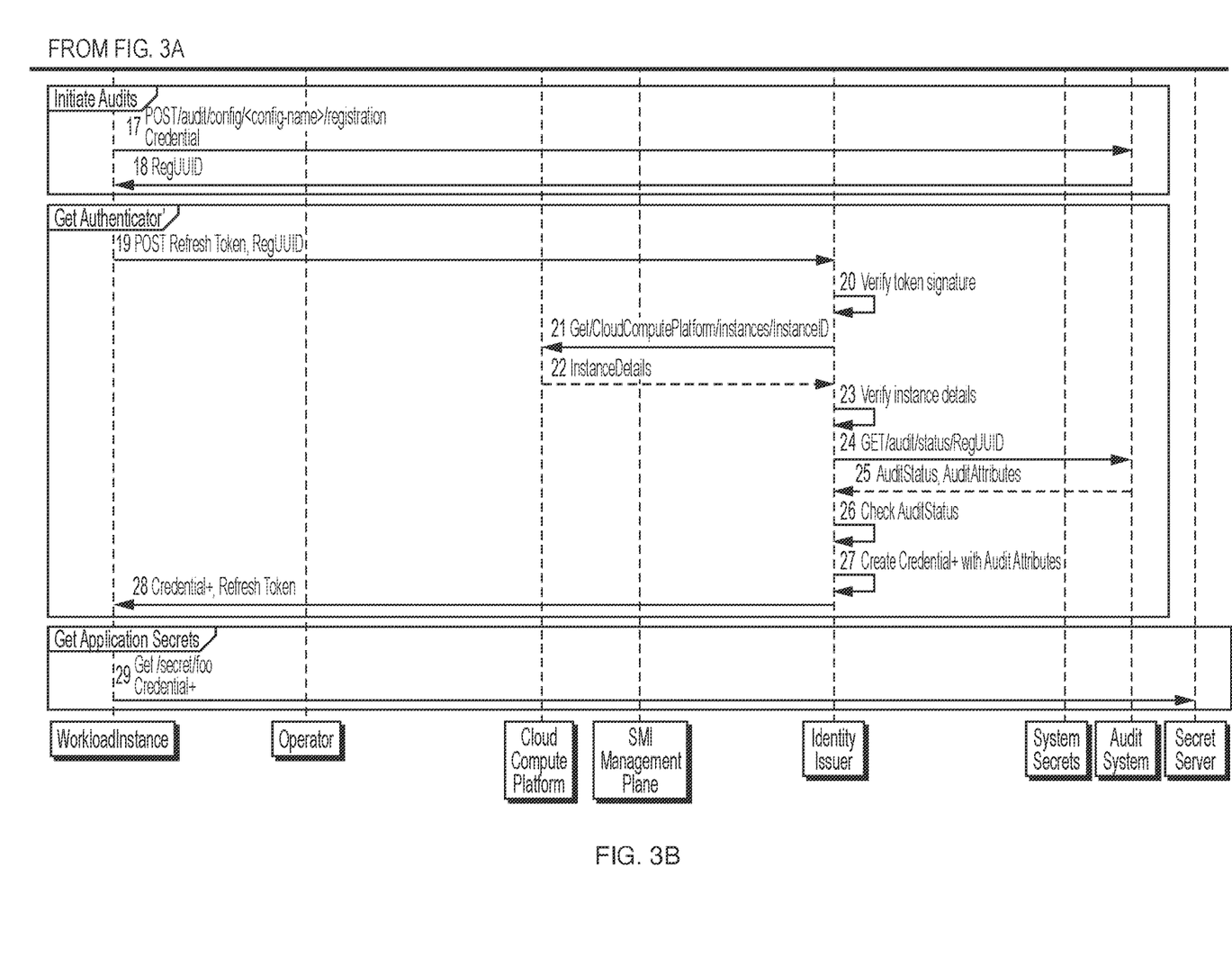

FIGS. 3A and 3B are a sequence diagram that largely tracks the workflow just described in connection with FIGS. 2A and 2B, while providing additional detail on the messaging amongst the relevant components. Messaging is expressed using HTTP conventions.

The first set of message exchanges is titled "Start VM With Token" (steps 1-4), and it illustrates the process of a workload instance (virtual machine or VM in this example) starting up. As described earlier, a workload operator obtains a token from the SMI Authentication Engine API and securely transfers the token to the workload instance (e.g., using the control plane of the compute platform).

"Authenticate" (steps 5 to 10) illustrates the process of the workload instance contacting the identity issuers and exchanging the token for a credential, as described above in connection with FIG. 2A. This diagram illustrates an additional feature in that the identity issuer can return not only the credential but also a refresh token. Hence the initial token issued to the workload instance (step 2 in FIG. 2A) can be exchanged for a refresh token. This approach allows the initial token to be a short lived token and to mitigate against compromise of the initial token. Using this refresh token functionality is an alternative embodiment.

Steps 6 to 8 illustrate how the identity issuer verifies certain attributes, or details, of the instance with the cloud compute platform's control plane. This process can use this information to verify the instance matches the label for the credential.

"Get System Secrets" (steps 11 to 16) illustrates the workload instance using the credential it obtained to fetch the keys necessary to encrypt its disk storage, that is, its encrypted root filesystem that is created upon startup. If the file system were previously created, this step could involve fetching the decryption keys needed to read the file system and report to the audit system. If 'agentless audits' are desired, the workload instance also fetches a SSH Certificate which can be presented to a client (the audit system) connecting to the workload instance to perform the audit.

"Initiate Audits" (steps 17-18) and "Get Authenticator" (steps 19 to 28) illustrate how the workload instance registers and passes an audit so as to upgrade its credential to credential+, enabling a higher level of access to secrets. This workflow corresponds to that illustrated and described linear with respect to FIG. 2B.

Finally, "Get Application Secrets" (step 29) illustrates the workload instance fetching additional secrets using its upgraded Credential. Step 29 can occur from time to time during the lifetime of the workload instance as it needs secrets. From time to time, the workload instance may be required to refresh its upgraded credential+ by going through another audit (steps 17-28), or to refresh its credential by going through steps 5-10 again.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 4:
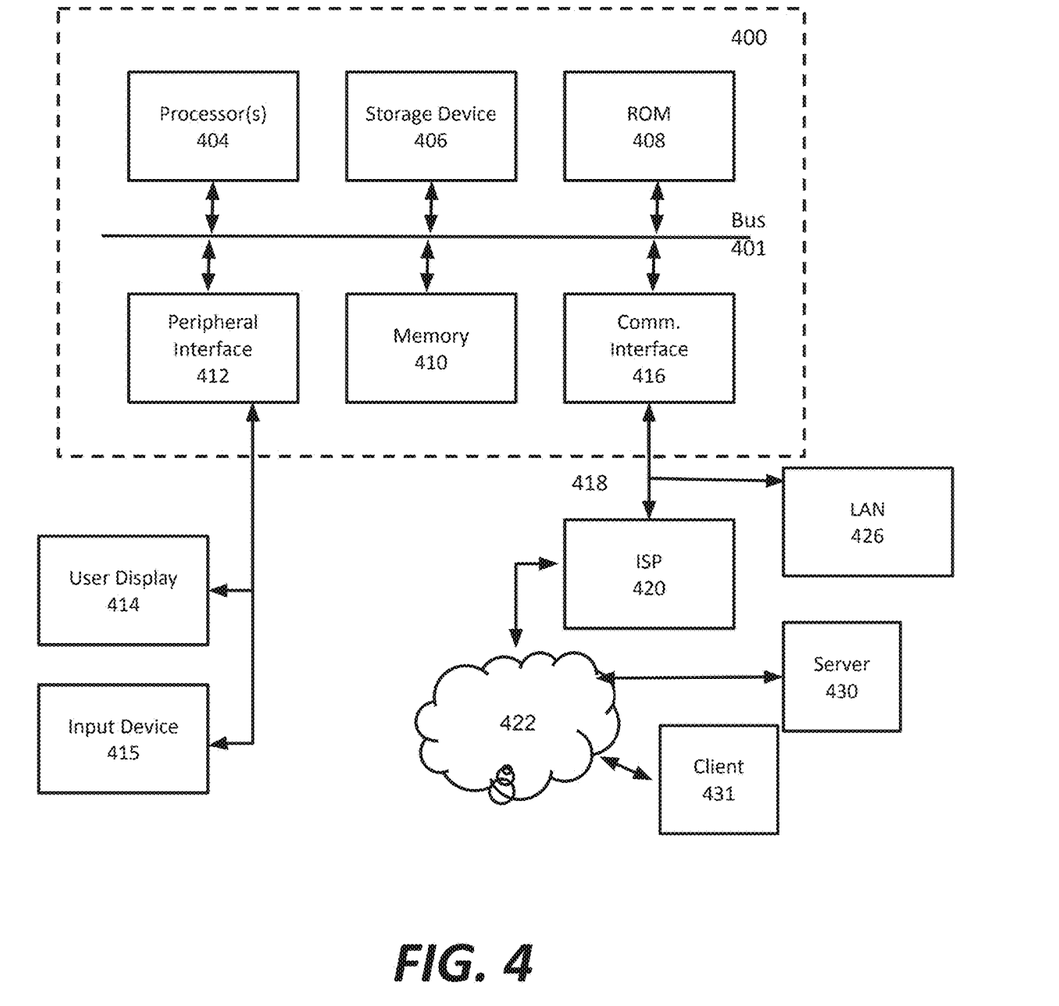

FIG. 4 is a block diagram that illustrates hardware in a computer system 400 upon which such software may run in order to implement embodiments of the invention. The computer system 400 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 400 includes a microprocessor 404 coupled to bus 401. In some systems, multiple processor and/or processor cores may be employed. Computer system 400 further includes a main memory 410, such as a random access memory (RAM) or other storage device, coupled to the bus 401 for storing information and instructions to be executed by processor 404. A read only memory (ROM) 408 is coupled to the bus 401 for storing information and instructions for processor 404. A non-volatile storage device 406, such as a magnetic disk, solid state memory (e.g., flash memory), or optical disk, is provided and coupled to bus 401 for storing information and instructions. Other application-specific integrated circuits (ASICs), field programmable gate arrays (FPGAs) or circuitry may be included in the computer system 400 to perform functions described herein.

A peripheral interface 412 may be provided to communicatively couple computer system 400 to a user display 414 that displays the output of software executing on the computer system, and an input device 415 (e.g., a keyboard, mouse, trackpad, touchscreen) that communicates user input and instructions to the computer system 400. However, in many embodiments, a computer system 400 may not have a user interface beyond a network port, e.g., in the case of a server in a rack. The peripheral interface 412 may include interface circuitry, control and/or level-shifting logic for local buses such as RS-485, Universal Serial Bus (USB), IEEE 1394, or other communication links.

Computer system 400 is coupled to a communication interface 416 that provides a link (e.g., at a physical layer, data link layer) between the system bus 401 and an external communication link. The communication interface 416 provides a network link 418. The communication interface 416 may represent an Ethernet or other network interface card (NIC), a wireless interface, modem, an optical interface, or other kind of input/output interface.

Network link 418 provides data communication through one or more networks to other devices. Such devices include other computer systems that are part of a local area network (LAN) 426. Furthermore, the network link 418 provides a link, via an internet service provider (ISP) 420, to the Internet 422. In turn, the Internet 422 may provide a link to other computing systems such as a remote server 430 and/or a remote client 431. Network link 418 and such networks may transmit data using packet-switched, circuit-switched, or other data-transmission approaches.

In operation, the computer system 400 may implement the functionality described herein as a result of the processor executing code. Such code may be read from or stored on a non-transitory computer-readable medium, such as memory 410, ROM 408, or storage device 406. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 418 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. A method performed by a secret management infrastructure that manages secrets for a compute platform, the method comprising:
    receiving, from an operator provisioning a workload instance in a cloud compute platform:
        a label corresponding to one or more attributes, the one or more attributes comprising any of physical, hardware or software attributes;
        an association between the label and a credential issued by the secret management infrastructure;
    receiving a request to distribute the credential to the workload instance in the compute platform;
    responsive to the request, identifying the label as required for access to the credential, and determining whether the workload instance matches the label by interrogating a source independent of the workload instance about at least one of: (i) the label applicable to the workload instance or (ii) the one or more attributes applicable to the workload instance;
    based on a determination that the workload instance matches the label, issuing the credential to the workload instance; and,
    based on a determination that the workload instance does not match the label, denying issuance of the credential to the workload instance.

2. The method of claim 1, wherein the request to distribute the credential is received from the workload instance.

3. The method of claim 1, wherein the request to distribute the credential includes a token previously issued by the compute platform to the workload instance during a provisioning process.

4. The method of claim 1, wherein the source independent of the workload instance comprises: a control plane of the compute platform.

5. The method of claim 4, the control plane being interrogated by the secret management infrastructure via an Applicant Programming Interface (API).

6. The method of claim 1, wherein the request to distribute the credential is received by an instance of a service provided by the secret management infrastructure which has been provisioned into a region in the computing platform.

7. The method of claim 1, wherein the workload instance comprises any of a virtual machine, container, node.

8. The method of claim 1, wherein the credential asserts an identity.

9. The method of claim 1, wherein the credential is issued to the workload instance, and further comprising:
    after receiving the credential, the workload instance sending the credential to a secret server in the secret management infrastructure to obtain a secret managed by the secret management infrastructure.

10. A secret management infrastructure that manages secrets for a compute platform, comprising one or more computers each having circuitry forming one or more processors and memory storing computer program instructions that, when executed, cause the one or more processors to cause the secret management infrastructure to:
    receive, from an operator provisioning a workload instance in a cloud compute platform:
        a label corresponding to one or more attributes, the one or more attributes comprising any of physical, hardware or software attributes;
        an association between the label and a credential issued by the secret management infrastructure;
    receive a request to distribute the credential to the workload instance in the compute platform;
    responsive to the request, identify the label as required for access to the credential, and determine whether the workload instance matches the label by interrogating a source independent of the workload instance about at least one of: (i) the label applicable to the workload instance or (ii) the one or more attributes applicable to the workload instance;
    based on a determination that the workload instance matches the label, issue the credential to the workload instance; and,
    based on a determination that the workload instance does not match the label, deny issuance of the credential to the workload instance.

11. The secret management infrastructure of claim 10, wherein the workload instance sends the request to distribute the credential.

12. The secret management infrastructure of claim 10, wherein the request to distribute the credential includes a token previously issued by the compute platform to the workload instance during a provisioning process.

13. The secret management infrastructure of claim 10, wherein the source independent of the workload instance comprises: a control plane of the compute platform.

14. The secret management infrastructure of claim 13, further comprising an Applicant Programming Interface (API) for interrogating the control plane.

15. The secret management infrastructure of claim 10, further comprising an instance of a service provided by the secret management infrastructure which has been provisioned into a region in the computing platform, the instance operable to receive the request to distribute the credential.

16. The secret management infrastructure of claim 10, wherein the workload instance comprises any of a virtual machine, container, node.

17. The secret management infrastructure of claim 10, wherein the credential asserts an identity.

18. The secret management infrastructure of claim 10, wherein the credential is issued to the workload instance, which is operable to send the credential to a secret server in the secret management infrastructure to obtain a secret managed by the secret management infrastructure.

19. A non-transitory computer readable medium holding computer program instructions for execution on one or more hardware processors in a secret management infrastructure, said instructions comprising instructions to:
receive, from an operator provisioning a workload instance in a cloud compute platform:
a label corresponding to one or more attributes, the one or more attributes comprising any of physical, hardware or software attributes;
an association between the label and a credential issued by the secret management infrastructure;
receive a request to distribute the credential to the workload instance in the compute platform;
responsive to the request, identify the label as required for access to the credential, and determine whether the workload instance matches the label by interrogating a source independent of the workload instance about at least one of: (i) the label applicable to the workload instance or (ii) the one or more attributes applicable to the workload instance;
based on a determination that the workload instance matches the label, issue the credential to the workload instance; and,
based on a determination that the workload instance does not match the label, deny issuance of the credential to the workload instance.

* * * * *